United States Patent
Zhou

(10) Patent No.: US 11,327,351 B2
(45) Date of Patent: May 10, 2022

(54) DISPLAY DEVICE INCLUDING A LIGHT SHIELDING LAYER COVERING A GAP

(71) Applicant: WUHAN CHINA STAR OPTOELECTRONICS TECHNOLOGY CO., LTD., Hubei (CN)

(72) Inventor: Zheng Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 235 days.

(21) Appl. No.: 16/630,693

(22) PCT Filed: Aug. 16, 2019

(86) PCT No.: PCT/CN2019/100975
§ 371 (c)(1),
(2) Date: Jan. 13, 2020

(87) PCT Pub. No.: WO2020/237843
PCT Pub. Date: Dec. 3, 2020

(65) Prior Publication Data
US 2021/0405429 A1  Dec. 30, 2021

(30) Foreign Application Priority Data
May 30, 2019 (CN) .......................... 201910460180.4

(51) Int. Cl.
*G02F 1/1333* (2006.01)
*F21V 8/00* (2006.01)

(52) U.S. Cl.
CPC ..... *G02F 1/133317* (2021.01); *G02B 6/0088* (2013.01)

(58) Field of Classification Search
CPC .................................................. G02F 1/133317
See application file for complete search history.

(56) References Cited

U.S. PATENT DOCUMENTS

| | | | |
|---|---|---|---|
| 10,802,207 B2* | 10/2020 | Chang | G02B 6/009 |
| 11,112,631 B2* | 9/2021 | Oh | G02F 1/133524 |
| 2010/0328927 A1* | 12/2010 | Huang | G02F 1/133606 362/97.1 |
| 2011/0096569 A1* | 4/2011 | Hamada | G02B 6/0085 362/613 |
| 2012/0113348 A1* | 5/2012 | Wang | G02F 1/133305 349/58 |
| 2014/0301104 A1* | 10/2014 | Lan | G02F 1/133615 362/607 |
| 2018/0120633 A1* | 5/2018 | Yang | G02F 1/133524 |
| 2019/0049773 A1* | 2/2019 | Woo | G09G 3/34 |

* cited by examiner

*Primary Examiner* — Keith G. Delahoussaye
(74) *Attorney, Agent, or Firm* — Benesch, Friedlander, Coplan & Aronoff LLP

(57) ABSTRACT

The invention provides a display device, including a backlight module, a plastic frame, and a sheet metal. The plastic frame is disposed on a side of the backlight module, and the plastic frame has a slot. The sheet metal includes a bottom portion and a bent portion perpendicular to the bottom portion, and the bent portion is bent to a side surface of the backlight module and correspondingly engaged in the slot of the plastic frame.

8 Claims, 1 Drawing Sheet

DISPLAY DEVICE INCLUDING A LIGHT SHIELDING LAYER COVERING A GAP

FIELD OF INVENTION

The present invention relates to the field of display, and particularly to a display device.

BACKGROUND OF INVENTION

With the development of display devices, people have increasingly higher demand on the appearance of display devices. Narrow border and borderless display devices are more attractive than wide border display devices and have better visual effects, consequently becoming the mainstream in current display devices. However, borderless displays on the market are not really completely borderless. They merely make the border of displays very small and narrow, so that the human eye cannot detect the border at a long distance, thereby achieving the effect of borderless.

In the field of in-vehicle display devices, people also have increasingly higher demand on the appearance of in-vehicle display devices and narrower border of vehicle display modules. At present, in-vehicle display devices usually adopt a design in which a middle plastic frame or a middle sheet metal encloses a bottom sheet metal, optical films, a light bar, and the like. Since the reliability requirements of in-vehicle display devices are relatively strict, the conventional module design in the market is limited by their structures. Narrow border or borderless design may cause problems such as light leakage from an edge of the display device and peeling of the display panel and the backlight module after the reliability test.

Technical Problem

An objective of the present invention is to provide a display device solving the problems in the prior art, which are light leakage from an edge in a narrow border or borderless design, and peeling of the display panel and the backlight module after reliability test.

SUMMARY OF INVENTION

In order to achieve the above object, the present invention provides a display device, including a backlight module, a plastic frame, and a sheet metal. The backlight module has a light emitting surface and a side surface perpendicular to the light emitting surface. The plastic frame is encapsulated on a side of the backlight module, and the plastic frame has a slot on a side of the backlight module. The sheet metal includes a bottom portion and a bent portion perpendicular to the bottom portion, wherein the bottom portion is disposed on a side of the backlight module away from the light emitting surface, and the bent portion is bent to a side surface of the backlight module and correspondingly engaged in the slot of the plastic frame.

Further, a gap is formed between the bent portion and the slot; the display device further includes a light shielding layer attached to the plastic frame positioned on the side of the backlight module and the bent portion of the sheet metal, and completely covers the gap.

Further, a shape of the bent portion conforms to the slot.

Further, the slot is T-shaped.

Further, the display device further includes a display panel disposed on a side of the light emitting surface of the backlight module.

Further, the plastic frame is sealed between the backlight module and the display panel, and is bent from between the backlight module and the display panel to the side of the backlight module.

Further, the display device further includes: an adhesive layer disposed between the display panel and the plastic frame.

Further, a thickness of the bent portion of the bottom portion is less than or equal to a thickness of the plastic frame.

Further, the backlight module includes: a light guide plate; a reflector disposed on a side away from the light emitting surface and positioned between the light guide plate and the sheet metal; and an optical film disposed on a side of the light guide plate away from the reflector.

Further, the reflector is bent from the side away from the light emitting surface to the side surface of the backlight module.

BENEFICIAL EFFECT

The advantages of the invention are: a display device of the present invention fixes the plastic frame on the sheet metal by engaging the bent portion of the sheet metal with the slot of the middle frame, thereby ensuring a stable basic structure of the display device. A thickness of the plastic frame is not increased while the structural function of the plastic frame is realized, and the thickness of the plastic frame or sheet metal is reduced in the design compared to the current design, thereby achieving the objective of reducing the frame of the module. Moreover, the problem of light leakage from an edge in the prior art is solved by providing the light shielding layer.

DESCRIPTION OF DRAWINGS

In order to clearly illustrate the technical solutions in the embodiments of the present invention, the drawings used in the embodiments will be briefly described below. It is obvious that the drawings in the following are only some embodiments of the present invention, and those skilled in the art can obtain other drawings according to the drawings without any creative work.

Figure 1:
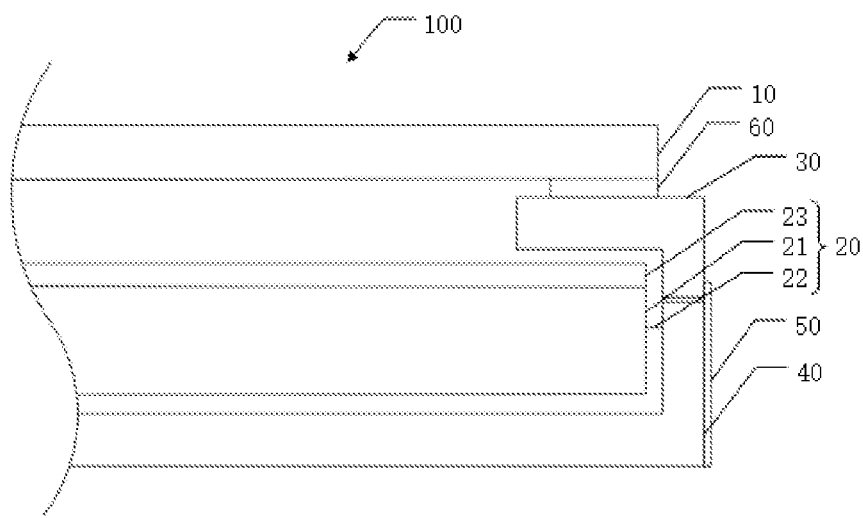
FIG. 1 is a layered schematic view of a display device of an embodiment of the present invention.

The reference numerals in the figures are as follows: display device 100; display panel 10; backlight module 20; light guide plate 21; reflector 22; optical film 23; plastic frame 30; slot 31; sheet metal 40; bent portion 41; bottom portion 42; light shielding layer 50; adhesive layer 60.

DETAILED DESCRIPTION OF PREFERRED EMBODIMENTS

The embodiments of the present application are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative and are not to be construed as limiting.

In the description of the present application, it is to be understood that the term "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. is based on orientation or positional relationship shown in the drawings, and is merely for the convenience of describing the present application and the simplified description, and does not indicate or imply that the device or element referred to has a specific orientation, and is constructed and operated in a specific orientation. Therefore, it should not be construed as limiting the application. Moreover, the term "first" or "second" is used for descriptive purposes only and is not to be construed as indicating or implying relative importance or implicitly indicating the number of technical features indicated. Thus, features defined by "first" or "second" may include one or more of the described features either explicitly or implicitly. In the description of the present application, the meaning of "a plurality of" is two or more unless specifically and specifically defined otherwise.

In the description of the present application, it should be noted that the terms "installation", "connected to each other", and "connected" should be understood broadly, unless clearly defined and limited. For example, it may be a fixed connection, a detachable connection, or an integral connection; It can be a mechanical connection, it can be an electrical connection or it can communicate with each other; it can be directly connected or indirectly connected through an intermediate medium, which can be the internal communication of two elements or the interaction of two elements. For those skilled in the art, the specific meanings of the above terms in the present application should be understood by a specific case.

In the present application, the first feature "on" or "under" the second feature may include direct contact of the first feature and the second feature, it may also be included that the first feature and the second feature are not in direct contact but are contacted by additional features between them unless otherwise explicitly stated and defined. Moreover, the first feature "above", "on" and "upon" the second feature includes the first feature is directly above and obliquely above the second feature, or merely indicating that a level height of the first feature is higher than that of the second feature. The first feature "below", "under" and "beneath" the second feature includes the first feature directly below and obliquely below the second feature, or merely indicating that a level height of the first feature is lower than that of the second feature.

The following disclosure provides various embodiments or examples for implementing the various structures of the present application. In order to simplify the disclosure of the present application, the elements and arrangements of the specific examples are described below. Obviously, they are merely examples and are not intended to limit the application. In addition, the present application may repeat reference numerals and/or reference letters in different examples, which are for the purpose of simplicity and clarity, and do not indicate the relationship between the various embodiments and/or arrangements discussed. Moreover, the present application provides examples of various specific processes and materials, but one of ordinary skill in the art will recognize the use of other processes and/or the use of other materials.

A display device 100 is provided in an embodiment of the present invention. As shown in FIG. 1, the display device 100 includes a backlight module 20, a plastic frame 30, a sheet metal 40, and a display panel 10.

The backlight module 20 has a light emitting surface and a side surface, and the side surface is perpendicular to the light emitting surface. The backlight module 20 is configured to provide a light source for the display panel 10, and the light source is emitted out through the light emitting surface. The display panel 10 is disposed on one side of the light emitting surface of the backlight module 20.

The display panel 10 is a liquid crystal display (LCD) panel for displaying images. The liquid crystal display panel 10 is a display using liquid crystals as a material. Liquid crystal is a special substance between solid and liquid. It is an organic compound. It is liquid in a normal state, but its molecular arrangement is as regular as solid crystal, so it is named liquid crystal. Another special property of this is that under the action of an electric field, the liquid crystal molecules change their arrangement, thereby affecting the change of light passing through them, and the change of the light can be expressed as a change of light and dark through the action of the polarizer. In this way, people control the changes of light and dark of the light by controlling the electric field, so as to achieve the purpose of displaying images. If setting a color filter, by changing the magnitude of the voltage applied to the liquid crystals, it is possible to change the amount of light transmission of a certain color. It can also be said that changing the voltage across the liquid crystals can change their transmittance.

The backlight module 20 is a light source disposed under the liquid crystal display panel 10, and its light emitting effect directly affects the visual effect of the liquid crystal display panel 10. The liquid crystal display panel 10 is a passive light-emitting element that cannot emit light by itself and the displayed picture or image is the result of the light modulation provided by the backlight module 20 underneath it. The backlight module 20 and the liquid crystal display panel 10 are combined to form a liquid crystal display module.

The backlight module 20 includes a light guide plate 21, a reflector 22, an optical film 23, and a light source (not shown). The reflector 22 is disposed on a side away from the light emitting surface of the backlight module 20, and the reflector 22 is bent from the side away from the light emitting surface to a side surface of the backlight module 20. The light guide plate 21 is disposed on the reflector 22. The optical film 23 is disposed on a side of the light guide plate 21 away from the reflector 22. The light source is disposed on one side or both sides of the backlight module 20.

The backlight module 20 is a planar illumination device, and the light sources are arranged on one side or both sides of the entire backlight module 20. The light source is generally a cold cathode fluorescent lamp (CCFL) or a light emitting diode (LED) light bar, the cold cathode fluorescent lamp is a line light source, and the LED light bar is a point light source. Thus, the use of the light guide plate 21 is required to convert the line source and the point source into a surface source. The light guide plate 21 is formed by pressing and molding a propylene film into a smooth surface plate, and then printing diffusion points on the bottom surface of the light guide plate 21 by screen printing method with a material having high reflection and no light absorption. The cold cathode fluorescent lamp or the light emitting diode light bar is disposed on the side of the light guide plate 21, and the emitted light is introduced into the light guide plate 21 by reflection. When the light arrives at the diffusion point, the reflected light will diffuse at various angles and destroy reflection condition and emit out from the front surface of the light guide plate 21. The light guide plate 21 can be uniformly illuminated by various diffusion points of different density and sizes. The purpose of the reflector 22 is to reflect the light that is emitted toward the bottom surface back into the light guide plate 21 for improving light use efficiency. The light guide plate 21 and the reflector 22 are used to guide the scattering and reflection directions of the light, and the light is not emitted from the area other than the light emitting surface, thereby improving the brightness of the backlight module 20 and ensuring uniformity of the brightness of the display panel 10. The optical film 23 is further disposed on the light guide plate 21, and the optical film 23 generally includes films such as a prism film, a diffuser film, and a brightness enhancement film. These films serve to increase the front view brightness, or axial brightness of the backlight module 20, improve the angular distribution of light without increasing the number of light sources, concentrate the light to the frontal angle, reduce losses, and increase the total light flux.

Figure 2:
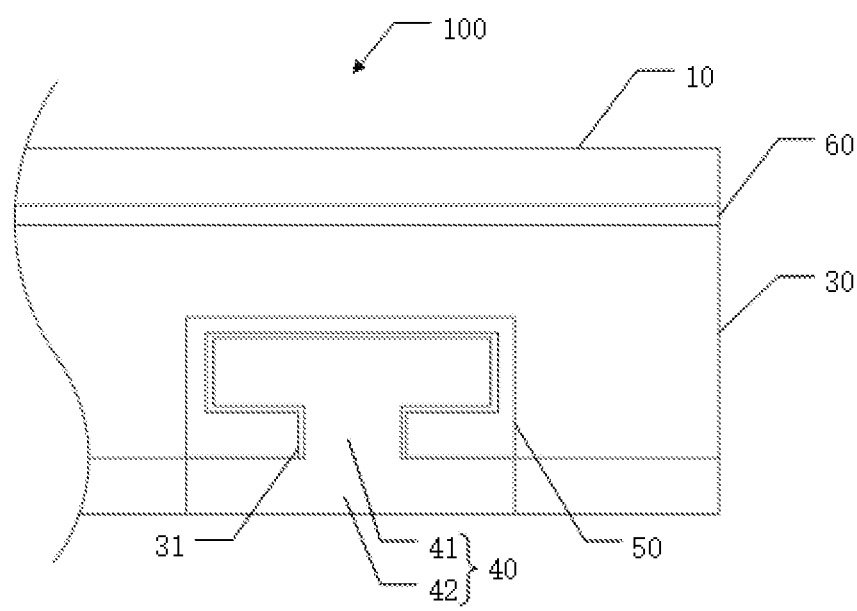
FIG. 2 is a side view of a display device of an embodiment of the present invention.

The plastic frame 30 is sealed between the backlight module 20 and the display panel 10 and is bent from between the backlight module 20 and the display panel 10 to the side of the backlight module 20. The display panel 10 is fixed to the plastic frame 30 by an adhesive layer 60. And on the side of the backlight module 20, the plastic frame 30 has a slot 31. As shown in FIG. 2, the slot 31 is T-shaped. The plastic frame 30 is used to protect the backlight module 20 and the display panel 10 to prevent the backlight module 20 and the display panel 10 from damages caused by crushing or bumping during production and transportation.

The sheet metal 40 includes a bottom portion 42 and a bent portion 41 that is perpendicular to the bottom plate portion 42. The bottom plate 42 is disposed on a side of the backlight module 20 away from the light emitting surface. As shown in FIG. 2, the bent portion 41 is bent to a side surface of the backlight module 20 and correspondingly engaged in the "T" shaped slot 31 of the plastic frame 30, and the shape of the bent portion 41 is matched to the slot 31, and a thickness of the bent portion 41 is less than or equal to a thickness of the slot 31. The sheet metal 40 is used to protect the backlight module 20, and the engagement of the bent portion 41 and the slot 31 ensures the stability of the basic structure of the backlight module 20 and the overall structure of the display device 100.

In other embodiments of the present invention, the slot 31 may also have other shapes such as a "[" shape, a "]" shape, a "F" shape, and the like, which also have a snap-fit function. Moreover, the layered structure of the display device 100 in other embodiments is similar to the display device 100 in which the slot 31 is "T" shaped, and will not be described too much herein. All other embodiments obtained by those skilled in the art based on the embodiments of the present application without creative efforts are within the scope of the present application.

The display device 100 further includes a light shielding layer 50. The light shielding layer 50 is attached to the plastic frame 30 on the side of the backlight module 20 and the bent portion 41 of the sheet metal 40 because a gap is between the bent portion 41 and the slot 31, and the gap is completely covered to prevent the entry of foreign matter and the leakage of light.

The display device 100 in this embodiment has a narrow border design and can be any product or component having a display function, such as a mobile phone, a tablet computer, a notebook, a digital camera, a navigator, and the like.

A display device 100 is provided in the embodiment of the present invention. The plastic frame 30 is fixed on the sheet metal 40 by engaging the bent portion 41 of the sheet metal 40 with the slot 31 of the middle frame. The bent portion 41 of the sheet metal 40 supports the plastic frame 30 in the vertical direction to ensure the basic structure of the backlight module 20 is stable. In addition, on the premise that the function of the plastic frame 30 is ensured, the side of the plastic frame 30 in the horizontal direction and the bent portion 41 of the sheet metal 40 are on the same vertical plane. The thickness of the plastic frame 30 is not increased while the structural function of the plastic frame 30 is realized, and the thickness of the plastic frame or sheet metal is reduced in the design compared to the current plastic frame and the sheet metal sidewalls, so as to reduce the frame of the module. Moreover, the problem of light leakage from an edge in the prior art is solved by providing the light shielding layer 50.

Although the invention has been described herein with reference to specific embodiments, it is understood that these embodiments are merely illustrative of the principles and applications of the invention. It is to be understood that various modifications may be made to the exemplary embodiments, and other arrangements may be made without departing from the spirit and scope of the invention as defined by the claims. It is to be understood that the various dependent claims and the features described herein may be combined in a manner different from that described in the original claims. It is also to be understood that features described in connection with the individual embodiments can be used in other described embodiments.

What is claimed is:

1. A display device, comprising:
   a backlight module having a light emitting surface, a side perpendicular to the light emitting surface, a light guide plate, a reflector, and an optical film;
   a plastic frame encapsulated on a side of the backlight module, wherein the plastic frame has a slot on the side of the backlight module; and
   a sheet metal having a bottom portion and a bent portion perpendicular to the bottom portion, wherein the bottom portion is disposed on a side of the backlight module away from the light emitting surface, and the bent portion is bent to a side surface of the backlight module and correspondingly engaged in the slot of the plastic frame
   wherein the reflector is disposed on a side away from the light emitting surface and positioned between the light guide plate and the sheet metal, and the optical film is disposed on a side of the light guide plate away from the reflector; and
   wherein the reflector is bent from the side away from the light emitting surface to the side surface of the backlight module.

2. The display device according to claim 1, wherein a gap is formed between the bent portion and the slot; the display device further comprises a light shielding layer attached to the plastic frame positioned on the side of the backlight module and the bent portion of the sheet metal, and completely covers the gap.

3. The display device according to claim 1, wherein a shape of the bent portion conforms to the slot.

4. The display device according to claim 3, wherein the slot is T-shaped.

5. The display device according to claim 1, further comprising a display panel disposed on a side of the light emitting surface of the backlight module.

6. The display device according to claim 5, wherein the plastic frame is sealed between the backlight module and the display panel, and is bent from between the backlight module and the display panel to the side of the backlight module.

7. The display device according to claim 5, further comprising:
   an adhesive layer disposed between the display panel and the plastic frame.

8. The display device according to claim 1, wherein a thickness of the bent portion of the bottom portion is less than or equal to a thickness of the plastic frame.

\* \* \* \* \*